United States Patent Office 2,742,699
Patented Apr. 24, 1956

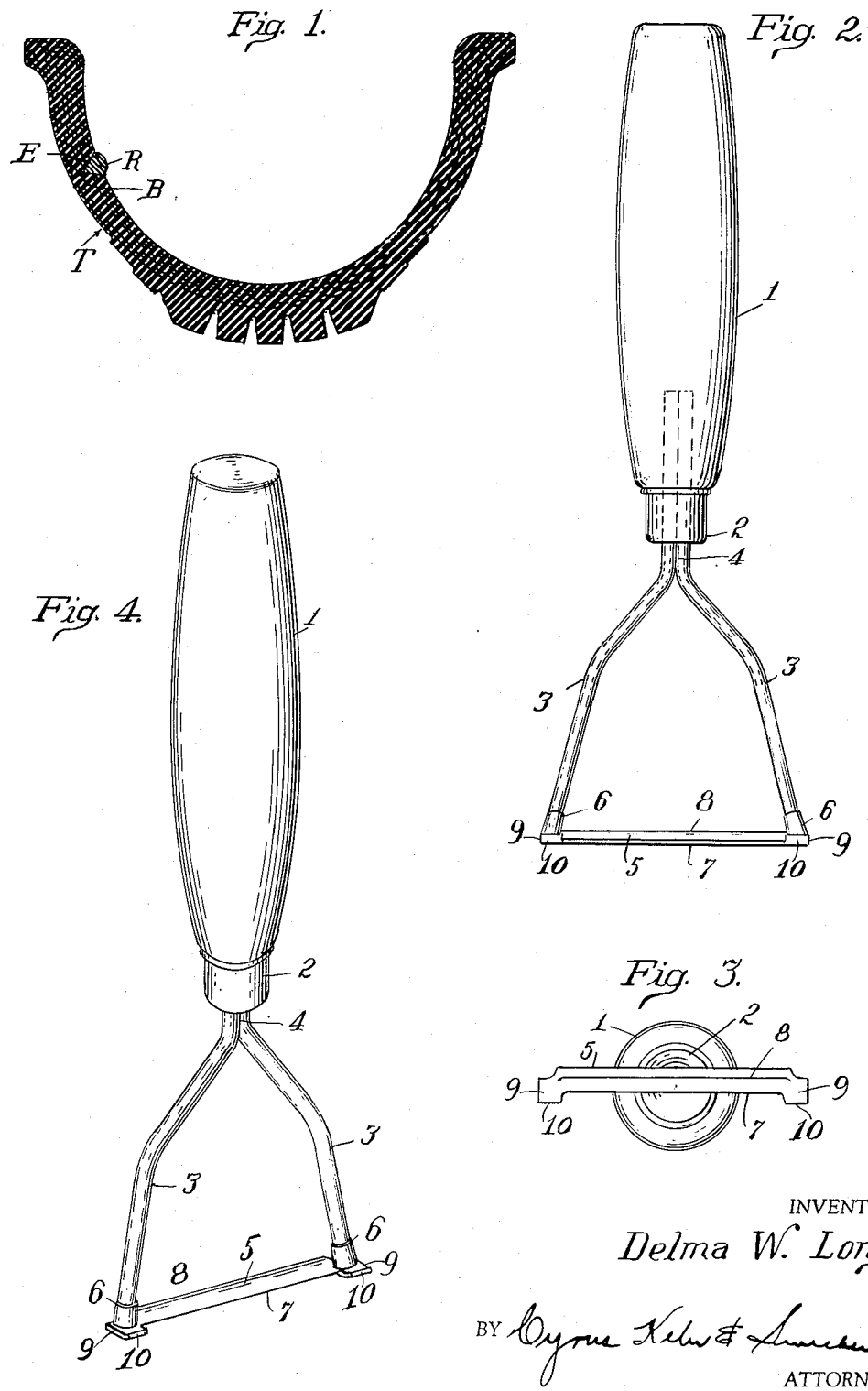

2,742,699

TIRE REPAIR INSTRUMENTS

Delma W. Long, Knoxville, Tenn.

Application June 22, 1953, Serial No. 363,222

1 Claim. (Cl. 30—280)

This invention relates to improvements in Tire Repair Instruments of the character used particularly for repairing breaks in tire casings.

It has been the practice heretofore to apply a filling of rubber to a tire casing to cover a break therein and to roll this down as nearly smooth as possible as a result of the rolling operation. However, it is impossible to get the filling very smooth and the rolling operation requires a considerable amount of time of a workman during the repair of the tire.

One object of this invention is to overcome these objections encountered heretofore and to provide an instrument which will smooth out the inside of the tire at the point of break by removing excess rubber filling or stock therefrom very quickly and easily.

A further object of the invention is to provide a tire repair instrument simple and inexpensive in construction which may be used for removing the excess rubber or stock on the inner side of a tire casing in a simple and effective operation without requiring a considerable amount of time in completing the repair of the tire.

These objects may be accomplished according to one embodiment of the invention by providing an instrument with a cutter blade supported in bridging relation between the ends of a pair of arms on a handle which will hold the blade steady and enable it to be used in removing an excess of rubber, stock or filling material applied in a break in the casing. Each of the arms preferably is of angular shape and arranged in diverging relation or bowed intermediate their length so as to increase the area of visibility of the operator, while providing a blade of maximum length and an attachment to a handle at a single point, as is highly desirable in an instrument of this character. When the blade is heated, the instrument may be used to trim off the surface or excess filling material very quickly and easily without the necessity for an extensive rolling action, as has been necessary heretofore, and at the same time providing a more effective and smoother surface in the casing.

These objects may be accomplished according to the embodiment set forth in the accompanying drawings, in which:

Fig. 1 is a cross section through a tire casing showing a break therein which may be repaired with the improved instrument of this invention;

Fig. 2 is a top plan view of the repair instrument;

Fig. 3 is an end elevation thereof; and

Fig. 4 is a perspective view thereof.

Referring to Fig. 1, a tire casing is designated generally at T, being shown as a conventional construction, and in which a break is illustrated at B which may occur transversely through the wall of the casing in the form of a slit. When such a break occurs in a tire casing and it is desired to repair the same, it has been the usual practice heretofore to bevel the edges of the break by a knife with a straight blade, as indicated generally at E. Then a filling of rubber, padding stock or the like R is applied in the bevelled portion of the break B, not only to fill the cavity thus formed, but with an excess of rubber or stock, which is illustrated in somewhat exaggerated form in Fig. 1.

Heretofore there has been no knife available that would remove the excess of rubber or stock R or trim it off from the surface of the casing. It has been the practice to roll it down as much as possible, which left the surface somewhat irregular, due to the presence of the mound of rubber or stock thus applied thereto, and a great deal of time was spent by an operator in trying to smooth out the rubber or stock and to get it as smooth as possible.

I have devised an instrument which may be used for removing the excess of material, which is illustrated in Figs. 2 to 4. This instrument uses an elongated handle, generally designated by the numeral 1, and provided with a ferrule 2 on the front end thereof. Any suitable handle may be used for the purpose, but I prefer to provide one which is constructed of heat insulating material which is also heatproof. A wooden handle may be used for the purpose or one formed of bakelite.

The handle 1 supports a pair of side members, generally designated at 3, which may be formed of wire, metal rods, or other suitable material that is also heatproof. These members 3 preferably are brought together at one end in parallel relation, at the point indicated at 4 in Fig. 2, and extend therefrom through the ferrule 2 and into the handle 1, as indicated in dotted lines therein. These ends may be secured together by soldering, welding or otherwise, if desired, although a tight fit in the handle will be sufficient to maintain them in proper relation with each other without a special fastening.

The opposite end portions of the side members 3, spaced outwardly from the handle 1, are in laterally diverging relation, somewhat bowed intermediate the lengths thereof so as to obtain the maximum area of view between the side members, for the operator to observe the working space and the cutting operation, as hereinafter described.

At the outer ends of the members 3 is secured a blade 5 which is stretched in bridging relation between the ends of the side members 3 and is secured thereto at 6. In the embodiment illustrated, the ends of the side members are cut off at right angles to the length thereof and the blade is abutted directly against these ends of the side members and is secured thereto by soldering, welding or the like. The portion of the blade intermediate the side members is sharpened to a knife edge, as illustrated at 7, which disposes the blade and its sharpened edge substantially at right angles to the length of the side members. The blade 5 may be sharpened at one or both opposite edges thereof, as desired, although only the edge 7 is sharpened in the embodiment illustrated. As shown, this edge 7 is on a central portion 8 of the blade between the opposite end portions 9 thereof to which the side members 3 are secured. The forward edges 10 of the end portions 9 extend beyond the sharpened edge 7 to prevent the latter from digging into the inside surface of the tire during use.

In repairing a break in the tire according to this invention, the edges of the break B are bevelled off at E, as usual, which may be done with a straight knife blade. These bevelled surfaces are then filled with rubber, stock or other composition to fill completely the cavity thus formed, usually with an excess of rubber or stock therein that forms a hump on the inner surface of the tire casing. This should be rolled down somewhat so as to obtain an effective binding and a tight filling of the cavity.

In the meantime, the instrument shown in Figs. 2 to 4 should be inserted in a suitable heating oven to heat the blade 5 until it is quite hot. Then the instrument is used to cut away the excessive mound of rubber material, illustrated generally at R in Fig. 1. The sharpened edge 7 may be forced down through the rubber stock or gum, severing this off smoothly with respect to the inner surface of the casing, either by a down or up stroke, leaving a smooth, level base with respect to the inner surface of the casing. The hot knife will cut through the cushion gum or rubber stock quite effectively, and a smooth surface will result without the extensive rolling action necessary heretofore, which nevertheless was ineffective in obtaining a smooth surface.

By reason of the flared shape of the side members 3 supporting the blade 5 therebetween, these side members may be secured to a single manipulative handle, and at the same time they do not obstruct the view of the operator of the area under treatment. The flared sides enable the operator to have a full view of the working area during the cutting operation, substantially throughout the length of the blade 5, which enables him to perform his operation very quickly and skillfully.

The manner of attaching the blade to the side members provides a secure instrument and at a very low cost of manufacture. Both the blade and the side members may be inserted in the heating oven, due to the heat resistant character of the side members, preferably formed of metal bars or wire of sufficient sturdiness and rigidity to withstand the action of the instrument in the cutting operation. This heating action does not affect the heat resistant handle 1 and the instrument may be withdrawn from the oven and used immediately.

While the invention has been illustrated and described in one embodiment, it is recognized that variations and changes may be made therein without departing from the invention as set forth in the claim.

I claim:

A tire repair instrument for removing excess material from the inside surface of a tire comprising an elongated handle, a pair of side members extending into the handle in side-by-side relation and secured thereto, each of said side members being formed of a metal rod-like member having an outer end, and bent intermediate the ends thereof substantially in bow shape with the concave side of the bow facing the other side member, and a cutting blade extending in bridging relation between said outer ends and secured rigidly thereto, said cutting blade comprising a metal plate secured at opposite end portions in abutting relation against said outer ends of the side members with said plate arranged substantially at right angles to the plane through said side members lengthwise thereof, said plate having a sharpened edge along a central portion thereof between said opposite end portions, said end portions having forward edges which extend beyond said sharpened edge to form the leading edges of said blade.

References Cited in the file of this patent

UNITED STATES PATENTS

| | | |
|---|---|---|
| 56,651 | Williams | July 24, 1866 |
| 691,861 | Hemstrom | Jan. 28, 1902 |
| 722,250 | Powell | Mar. 10, 1903 |
| 1,154,472 | Yakushiji | Sept. 21, 1915 |
| 1,627,901 | Hills | May 10, 1927 |
| 1,730,907 | Whitmire | Oct. 8, 1929 |
| 2,404,495 | Hallum | July 23, 1946 |